Sept. 13, 1932.   J. L. GILMORE   1,876,912
SPARE TIRE CARRIER
Filed Oct. 17, 1929
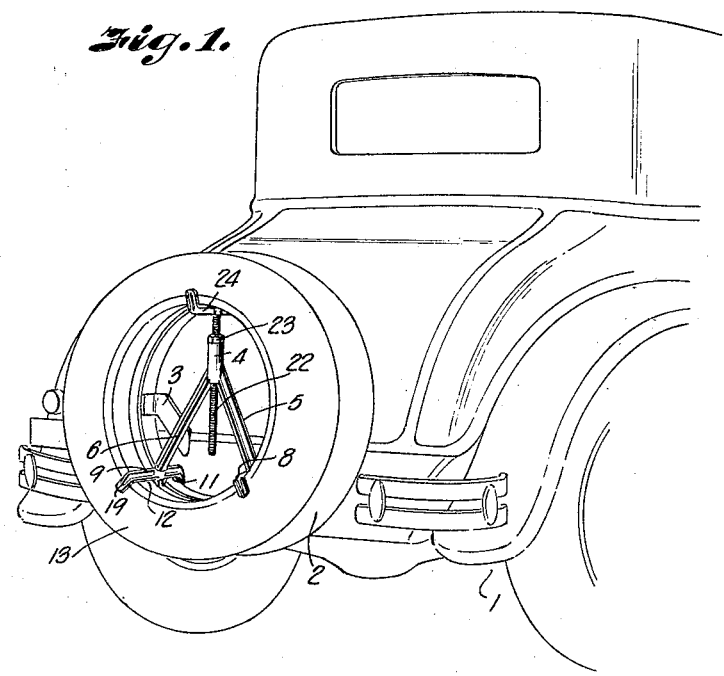
INVENTOR
John L. Gilmore
BY
ATTORNEY Patented Sept. 13, 1932

1,876,912

UNITED STATES PATENT OFFICE

JOHN L. GILMORE, OF KANSAS CITY, MISSOURI

SPARE TIRE CARRIER

Application filed October 17, 1929. Serial No. 400,294.

My invention relates to spare tire carriers and has for its principal objects to facilitate the application of an auxiliary spare tire carrier to a spare tire and an auxiliary spare tire to the carrier, to space an auxiliary spare tire from a supported spare tire, to increase the strength and stability of an auxiliary spare tire carrier, and to facilitate the adjustment of a carrier to rims and tires having varying diameters.

Tire carriers ordinarily are not susceptible of adjustment when once mounted and auxiliary spare tires are installed thereon, particularly when the rims of the spare and auxiliary tires have different diameters. When the hooks of the carriers do not firmly engage the supports and the auxiliary spare tires, the carriers may be loosened or the auxiliary spare tires may fall.

Further objects of my invention therefore are to facilitate readjustment of a carrier while in mounted position supporting an auxiliary spare tire, in order to more firmly engage the carrier with both the supporting tire and the auxiliary spare tire.

In accomplishing these and other objects of my invention, I have provided improved details of structure, the preferred forms of which are illustrated in the accompanying drawing, wherein:

Fig. 1 is a perspective view of the rear end of an automobile provided with a tire, and my improved carrier supporting an auxiliary spare tire from the first named tire.

Fig. 2 is an enlarged perspective view of my improved spare tire carrier.

Fig. 3 is a vertical section through the carrier illustrating particularly the relations between the upper and lower tire-engaging arms and the supporting member of the carrier.

Referring in detail to the drawing:

1 designates generally an automobile provided with a spare tire 2 supported by a permanent rack 3 from the rear end of the automobile.

My device includes a supporting frame comprising a tubular body 4 and legs 5 and 6 diverging downwardly from the body and integral therewith. The legs have protruding integral studs or spindles 7 at their lower ends on which arms 8 and 9 having central openings 10 are rotatively and loosely mounted. The arms have seats or sockets 11 and 12 at opposite ends for engaging respectively the supported spare tire 2 and an auxiliary spare tire 13.

The arms are supported and retained on the spindles by cotter pins 14 located a sufficient distance from the shoulders 15 at the inner ends of the spindles to permit a substantial amount of play for the arms between the shoulders and the pins. The openings in the arms are substantially larger than the spindles, to permit tilting of the arms for accommodating the support to an auxiliary rim having a different internal diameter from that of the supporting rim and to allow the seats to fit squarely against the inner faces of the rims.

The arms comprise bars 16 having longitudinal central stiffening ribs 17 on their upper surfaces and apertured bosses 18 surrounding the openings 10 to form seats for the shoulders 15 and reinforce the ribs.

Outwardly downwardly extending fingers 19 at the ends of the arms form the outer walls of the sockets, and spaced bosses or tongues 20 on each side of the openings 10 have slanting outer faces 21 forming the inner walls of the sockets.

The spaced tongues form recesses in the lower faces of the arms into which the spindles 7 extend.

Slidable in the tubular body is a threaded rod 22 provided with a nut 23 movable therealong for supporting the rod in adjusted position on the frame.

An upper arm 24 having sockets 25 and 26 formed similarly to the sockets of the lower arms is provided with a central opening 27 for mounting the arm on a stud 28 on the upper end of the rod for support of the arm on the shoulder 29 of the rod produced by reducing the rod end to form the stud. The arm 24 is keyed to the rod by a pin 30, the rod thus forming a central depending shaft adapted to be adjusted in the frame for supporting the arm and providing an extensible tire-engaging member.

In using the device, the nut is moved on the rod to adjust the spacing of the upper arm from the lower arms approximately to the sizes of the tires and rims used on the automobile, and so that the rod will extend sufficiently into the body to permit the inner ends of the arms to be mounted on the rim of the spare tire.

The inner end sockets of the lower arms engage the spare tire rim at points spaced from the vertical diameter of the spare tire, and the upper arm is rotated to locate the inner end thereof at a point in the vertical diameter of the spare tire.

The auxiliary spare may then be mounted on the outer sockets of the arms. The nut may then be operated to spread the upper arm from the frame and latch the arms to the tire rims.

The depending shaft slidable in the tubular body, and the nut on the shaft, afford means for adjusting the extension of the upper arm while the frame is in functioning position.

Attention is particularly called to the unthreaded character of the tubular body of the support, in which the threaded rod is freely slidable, the rod being adjusted by the nut seating on the body. Relatively inexpensive construction of a casting to support the rod and arms is thus provided for, since the body does not require threading.

What I claim and desire to secure by Letters Patent is:

1. A spare tire carrier including a tubular body, outwardly diverging legs integral with said body having reduced portions on the lower ends forming stop shoulders thereon, a threaded shaft freely and slidably mounted in the tubular body, an arm fixed to said shaft having rim seats for engaging respectively the rim of a spare tire and the rim of an auxiliary tire, a nut on said shaft for adjustably supporting the shaft from the tubular body, complementary arms having seats similar to said first named seats and having openings between the seats thereof to loosely receive the reduced portions of said legs whereby the complementary arms may be pivoted relatively to the legs to admit the rim of the auxiliary tire when the carrier has been applied to the spare tire and to permit the seats in said complementary arms to fit squarely against the rims of the tires when the carrier is applied to tires of different diameters, and means on the lower ends of said reduced portions to retain said complementary arms.

2. A spare tire carrier including a tubular body, outwardly diverging legs rigidly connected with said body and having reduced portions on their lower ends forming stop shoulders thereon, a threaded shaft slidable freely in the tubular body, an arm rigidly connected to said shaft and having rim seats for engaging respectively the rim of a spare tire and the rim of an auxiliary tire, complementary arms provided with seats similar to said first named seats and having recesses formed between said seats and having openings aligning with said recesses for loosely engaging the reduced portions of said legs whereby the complementary arms may be pivoted relatively to the legs to admit the rim of an auxiliary tire when the carrier is applied to a spare tire and to permit lateral adjustment whereby said complementary arms may fit squarely against the rims, means in said recesses and engaging the ends of said reduced portions to retain the complementary arms thereon, and a nut threaded on said shaft and engaging the tubular body portion for moving the shoulder portions of said legs against the complementary arms to prevent pivotal movement of the arms on said reduced portions.

In testimony whereof I affix my signature.

JOHN L. GILMORE.